United States Patent
Vedula et al.

(10) Patent No.: US 9,886,254 B2
(45) Date of Patent: Feb. 6, 2018

(54) INCREMENTAL PROVISIONING OF CLOUD-BASED MODULES

(71) Applicant: Oracle International Corporation, Redwood Shores, CA (US)

(72) Inventors: Venkata Naga Ravikiran Vedula, Belmont, CA (US); Justin Cheevers, San Mateo, CA (US); Monty Bucholz, Bozeman, MT (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 133 days.

(21) Appl. No.: 14/590,680

(22) Filed: Jan. 6, 2015

(65) Prior Publication Data
US 2016/0196124 A1    Jul. 7, 2016

(51) Int. Cl.
*G06F 9/445*    (2006.01)

(52) U.S. Cl.
CPC . *G06F 8/61* (2013.01); *G06F 8/60* (2013.01)

(58) Field of Classification Search
CPC .......... G06F 8/61; G06F 8/60; G06F 9/44505
See application file for complete search history.

(56) References Cited

U.S. PATENT DOCUMENTS

| | | | | |
|---|---|---|---|---|
| 9,069,607 | B1* | 6/2015 | Gopalakrishna Alevoor | G06F 9/45558 |
| 2006/0242626 | A1* | 10/2006 | Pham | G06F 9/44505 717/121 |
| 2010/0281456 | A1* | 11/2010 | Eizenman | G06F 8/20 717/104 |
| 2013/0283262 | A1* | 10/2013 | Rehtijarvi | G06F 8/60 717/178 |
| 2013/0332900 | A1* | 12/2013 | Berg | G06F 8/71 717/121 |
| 2014/0130036 | A1* | 5/2014 | Gurikar | G06F 8/61 717/176 |

* cited by examiner

*Primary Examiner* — Lewis A Bullock, Jr.
*Assistant Examiner* — Jacob Dascomb
(74) *Attorney, Agent, or Firm* — Kilpatrick Townsend & Stockton LLP

(57) ABSTRACT

A method of provisioning cloud-based software may include receiving provisioning information for provisioning a cloud-based software package, and determining modules that are part of the software package. The method may also include identifying a subset of the plurality of modules requiring parameters for provisioning that are included in the provisioning information, and provisioning the first set of modules using at least some of the parameters. The method may additionally include identifying a subset of modules requiring parameters that are not included in the provisioning information, and providing a self-service application configured to receive, at a later time, the parameters that are not included in the provisioning information and provision the second set of modules.

15 Claims, 12 Drawing Sheets

INCREMENTAL PROVISIONING OF CLOUD-BASED MODULES

BACKGROUND

In modern computing, many software applications are being offered via cloud-based services. Client devices are able to select from among a plurality of Software as a Service (SaaS) packages that best meet system requirements. Once an SaaS service receives a request for a software package, the service can begin provisioning the software package. In general, provisioning means providing or making the requested software package available to the client device. For large Enterprise applications and cloud-based services, the provisioning process is largely a manual process due to its complexity and the number of resources involved.

BRIEF SUMMARY

In some embodiments, a method of provisioning cloud-based software may be presented. The method may include receiving provisioning information for provisioning a cloud-based software package. The provisioning information may include a code that identifies the software package and/or one or more parameters for provisioning the software package. The method may also include using the code to determine a plurality of modules that are part of the software package and identifying a first set of modules. The first set of modules may be a subset of the plurality of modules, and the first set of modules may require parameters for provisioning that are included in the one or more parameters. The method may additionally include provisioning the first set of modules using at least some of the one or more parameters. The method may further include identifying a second set of modules. The second set of modules may be a subset of the plurality of modules, the second set of modules may require parameters that are not included in the one or more parameters. The method may also include providing a self-service application configured to receive, at a later time, the parameters that are not included in the one or more parameters and provision the second set of modules.

In some embodiments, a non-transitory computer-readable medium may be presented. The computer-readable memory may include instructions that, when executed by one or more processors, causes the one or more processors to perform operations including receiving provisioning information for provisioning a cloud-based software package. The provisioning information may include a code that identifies the software package and/or one or more parameters for provisioning the software package. The operations may also include using the code to determine a plurality of modules that are part of the software package and identifying a first set of modules. The first set of modules may be a subset of the plurality of modules, and the first set of modules may require parameters for provisioning that are included in the one or more parameters. The operations may additionally include provisioning the first set of modules using at least some of the one or more parameters. The operations may further include identifying a second set of modules. The second set of modules may be a subset of the plurality of modules, the second set of modules may require parameters that are not included in the one or more parameters. The operations may also include providing a self-service application configured to receive, at a later time, the parameters that are not included in the one or more parameters and provision the second set of modules.

In some embodiments, a system may be presented. The system may include one or more processors and one or more memory devices including instructions that, when executed by the one or more processors, cause the one or more processors to perform operations including receiving provisioning information for provisioning a cloud-based software package. The provisioning information may include a code that identifies the software package and/or one or more parameters for provisioning the software package. The operations may also include using the code to determine a plurality of modules that are part of the software package and identifying a first set of modules. The first set of modules may be a subset of the plurality of modules, and the first set of modules may require parameters for provisioning that are included in the one or more parameters. The operations may additionally include provisioning the first set of modules using at least some of the one or more parameters. The operations may further include identifying a second set of modules. The second set of modules may be a subset of the plurality of modules, the second set of modules may require parameters that are not included in the one or more parameters. The operations may also include providing a self-service application configured to receive, at a later time, the parameters that are not included in the one or more parameters and provision the second set of modules.

In some embodiments, one or more of the following features may be included in any combination and without limitation. The method/operations may include sending a link associated with the self-service application to a client device associated with the provisioning information. The method/operations may additionally include generating, using the self-service application, an interface; sending an indication of the parameters that are not included in the one or more parameters to a client device associated with the provisioning information; receiving the parameters that are not included in the one or more parameters through the interface; and provisioning the second set of modules using at least some of the parameters that are not included in the one or more parameters. The method/operations may additionally include identifying a first set of scripts, where each of the first set of scripts may be associated with a respective one of the first set of modules, and where each of the first set of scripts may be executable to provision the first set of modules. The method/operations may further include, prior to receiving the parameters that are not included in the one or more parameters, provisioning a base instance of the second set of modules. The one or more parameters may include a number of site instances to be provisioned. The method/operations may also include storing a status for provisioning a cloud-based software package after identifying the second set of modules, where the status may include the provisioning information and an indication of the parameters that are not included in the one or more parameters. The method/operations may additionally include automatically selecting between a plurality of available cloud data centers on which to provision the first set of modules using a load balancer.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein, are embodiments for systems that provide for the automatic and incremental provisioning of cloud-based software packages. The request may be received from a client device that includes a cod or identifier for the software package. The system can decode the identifier and determine a plurality of software modules that are included in the package. Configuration files can be generated that maintain up-to-date definitions for each software package. The request may also include parameters that can be used to provision the various software modules in the software package. The system can use the configuration file to determine which modules can be provisioned according to the provided parameters. These modules can be provisioned automatically using predefined software scripts that accept the parameters. If required parameters are not included with the request, the system can generate base instances of any remaining software modules and provide a self-service application configured to later accept parameters from the client device. At a later time, the self-service application can receive a transmission from the client device and, using an identity management system, authenticate an account associated with the device and retrieve the state of the provisioning process. The self-service application can then receive any parameters missing from the original request, and fully provision any remaining software modules.

Figure 1:
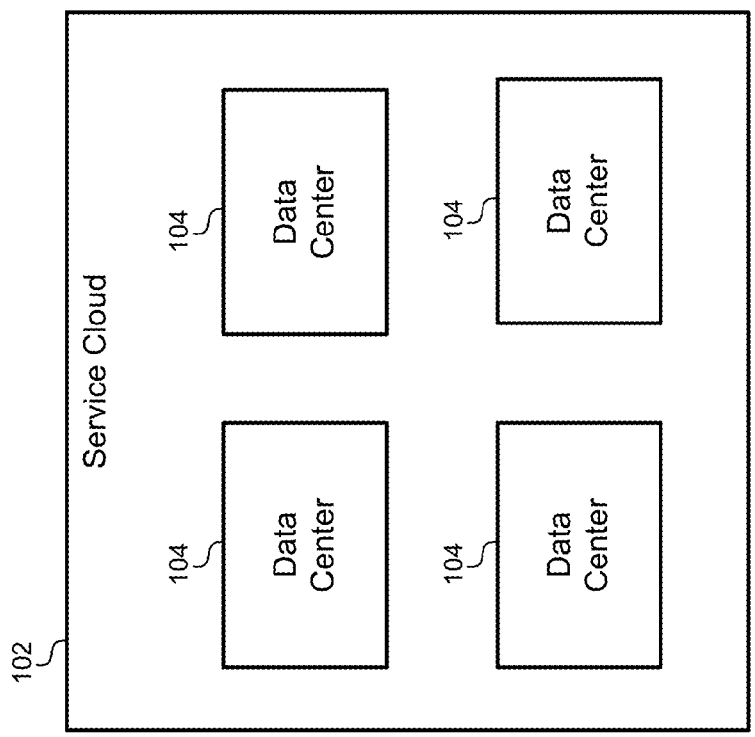
FIG. 1 illustrates a block diagram of a Software as a Service (SaaS) cloud, according to one embodiment.

FIG. 1 illustrates a block diagram of a Software as a Service (SaaS) cloud, according to one embodiment. Cloud services or cloud software packages refer to services made available to users on demand over a network, such as the Internet, from a cloud computing provider. The servers of the cloud computing provider can provide scalable access to applications, resources, services, and storage. The servers can be distributed worldwide and managed by a cloud service provider. A collective network of hardware and software used to provide cloud services may be referred to as a service cloud 102. The service cloud may service worldwide customers by locating hardware and software in concentrated data centers 104 that are distributed near population centers where cloud services are likely to be used. For example, data centers may be located in Chicago, Los Angeles, New York, London, Tokyo, and so forth. When an entity secures a license to use a cloud-based service, the service will be provisioned on one or more of the data centers 104 according to load-balancing protocols and general proximity to those who will be using the service. In one embodiment, cloud-based services can be hosted in approximately 17 data centers across the globe.

The service cloud 102 can offer a cloud-based customer service suite of applications. Such applications may include web self-service, a contact center application, a knowledge management application, policy automation products, email servers, hosted websites, and/or the like. When a customer secures a license to use one or more of these cloud-based services, the services will be provisioned. As used herein, the term "provisioned" refers to making the cloud-based services available for a licensee to access/use. For example, if a user purchases a policy automation suite with the email service, the provisioning process will set up an email server and the associated communication protocols and generate instances of the policy automation service at data centers 104 that are dictated by the customer geography, customer demand locations, and/or explicit requests by the customer purchasing the cloud-based services.

Prior to this disclosure, very few cloud-based services could be fully provisioned in an automated fashion. This was particularly true for large enterprise software applications. Generally, these large cloud-based services required an extensive amount of information to be gathered from a customer before they could be provisioned. For example, when provisioning a website, the cloud service needed to know locations, languages, URLs, backend database information, and so forth in order to provision versions of the website at various data centers. Oftentimes those purchasing the products would not have immediate access to such information. Therefore, the customers could not be provided with access to a provisioned cloud-based service until the service gathered all the necessary information. This generally strung out the process over the course of weeks and months until all the information could be finalized and each of the services could be provisioned. In contrast, the embodiments described herein provide for an incremental provisioning of cloud-based services in an automated fashion that is able to accommodate various levels of information provided by the customer.

Figure 2:
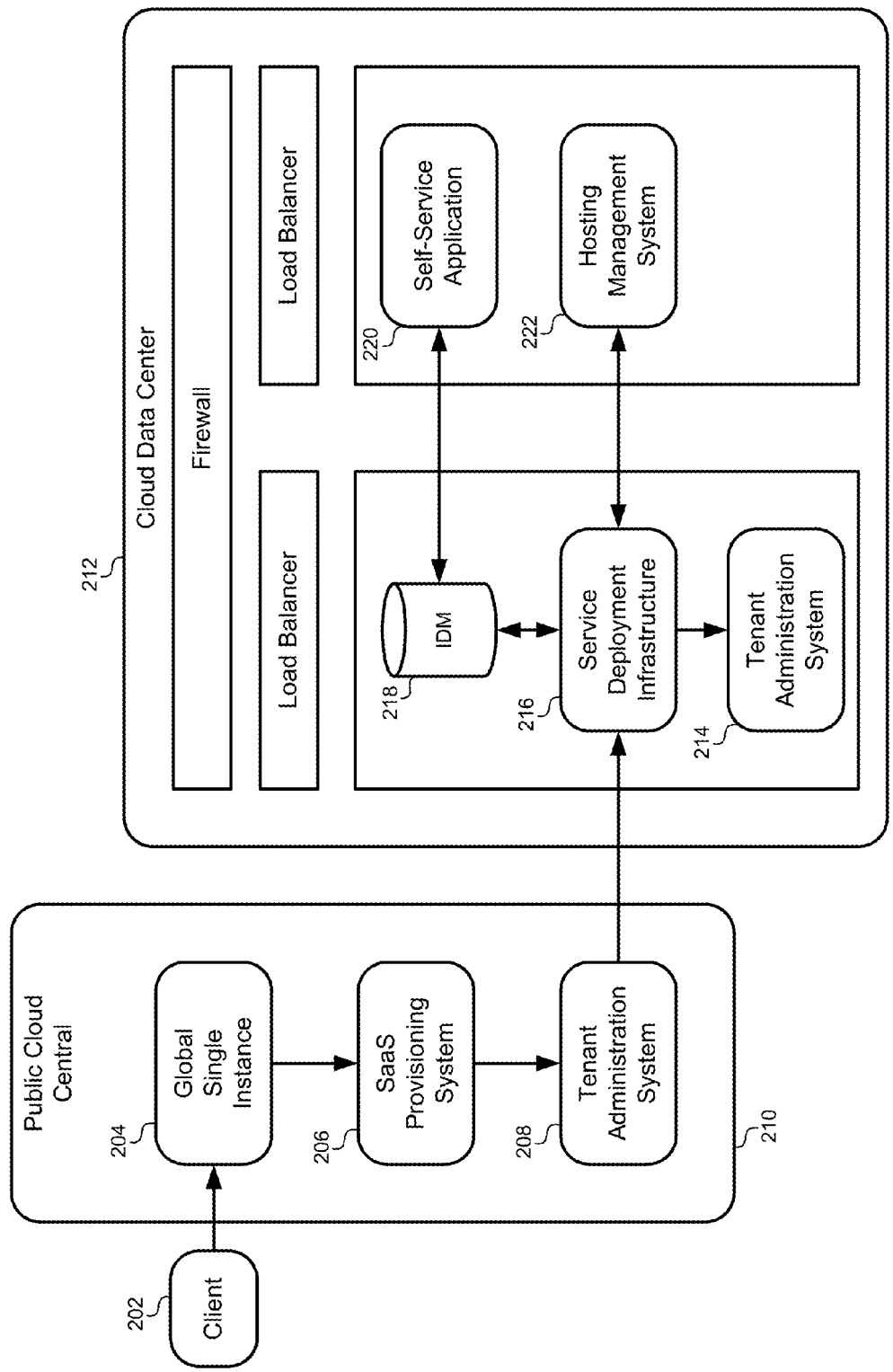
FIG. 2 illustrates a simplified block diagram of a cloud-based system for provisioning cloud services, according to one embodiment.

FIG. 2 illustrates a simplified block diagram of a cloud-based system for provisioning cloud services, according to one embodiment. The methods and systems described herein may be implemented using a cloud-based service, such as the service described below in FIGS. 10-12. In other embodiments, a dedicated hardware platform may be designed to implement the functionality described herein. This dedicated hardware may be designed using processors, memories, microcontrollers, buses, communication ports, network access ports, adapters, digital circuits, analog circuits, instruction sets, and/or the like, that are well-known in the art and would be readily understood by one having skill in the art. FIG. 2 represents an abstraction of the functions that may be implemented using these types of hardware. After reading this disclosure, one having skill in the art could use these well-known circuit elements to construct the device(s) shown in FIG. 2 to implement these methods and systems.

A client device 202 may be operated by a customer and used to purchase cloud-based software packages through a web portal provided by a public cloud interface 210. As used herein, the term "software package" will refer to a combination of one or more individual software modules in a cloud-based service platform. It has been discovered that customers often prefer to purchase cloud-based services in bundles of related products. As used herein, the term "client device" 202 may refer to a single device used by a client, but will more often refer collectively to any hardware used by a particular user identity. For example, a client device may collectively refer to any computers used by a particular business client. Instead of having to individually enumerate each service they would like to license, customers can select predefined software packages that combine individual software modules into a convenient package. These packages, as well as individual software modules can be presented on the web portal of the public cloud interface 210 and selected and purchased through a standard web purchasing application.

In some embodiments, the web purchasing application can be part of Global Single Instance (GSI) that represents a software installation of an enterprise software suite. The GSI may include identity management features, financial software, human resource management software, purchasing software, and so forth. The GSI 204 can provide an indication of a selected software package to a SaaS Provisioning System (SPS) 206 that can track all incoming software orders. The SPS 206 can generate tickets for an automated customer service function such that individual purchases can be tracked and monitored throughout the provisioning process. After generating a tracking ticket, the SPS 206 can pass the software request onto a Tenant Administration System (TAS) 208. The TAS 208 can then send the order to a particular cloud data center 212 where the cloud-based services will be provisioned.

Once received by the cloud data center 212 a local TAS 214 and a Service Deployment Infrastructure (SDI) 216 can begin establishing the provisioning process. The SDI 216 is a brokering application between ERP applications of the GSI 204 and the cloud data center 212 of the service cloud. The task performed by the SDI 216 may be described as a high-level sorting function to determine the types of software modules that will be installed as part of the provisioning process. The technical details for installing each module that is part of the requested software package will be highly individualized. Therefore, the SDI 216 will perform a coarse sorting operation and send the individual provisioning tasks that are more module-specific to individual applications that are configured to handle each module. The SDI 216 can arbitrate between products by checking a cod or identifier field associated with each software module in the software package and perform a routing function for provisioning. In one sense, this can be similar to high-level URL parsing in that the SDI 216 simply determines where the provisioning process for each software module should go.

Each type of module may be associated with a Hosting Management System (HMS) 222 that a specially configured to provision modules of that type. For example, a software package may include a request for two separate email servers/domains. The SDI 216 can select from among a plurality of HMS installations and send the request for the email servers/domains to a particular HMS 222 that is configured with the details for provisioning this type of email server/domains. The HMS 222 analyzes each order from a module-specific perspective and determines what actually needs to be provisioned. For example, the service cloud may include 15 different offerings. The HMS 222 can analyze the software package request and determine whether a small or large instance was ordered, whether a marketing application was included, whether policy automation was included, and so forth. The HMS 222 specific to each module will then analyze the details and determine how exactly to provision each module. The HMS 222 also translates the business-level details of an order into a set of technologies to be constructed during the provisioning process. For example, a policy automation server may require a database to be provisioned and a Java-based web application to be instantiated. In contrast, a service cloud module may require a database and PHP to run a web application that is part of the service cloud instance, along with the front-end website that is PHP-based and communicating with the database at the backend. Some installations may require a desktop client to be installed, and so forth.

As will be described in greater detail below, the initial request for a software package may not include all of the necessary information required to provision each of the included software modules. As used herein, the term "parameters" will refer broadly to any information provided from the client device 202 that is used by the cloud data center 212 to provision one or more software modules. Parameters may include a URL, a language specification, a domain name, contact information, a database size, technical requirements, service cloud data center locations, numbers of instances of a certain applications to be installed, and so forth. The HMS 222 will generally handle and provision any software modules for which the requisite parameters have been received. For software modules with parameters that have not yet been received, a self-service application 220 may be provided. The self-service application 220 can provide a cloud interface for the client device 202 to provide missing parameters at a later time. When the self-service application 220 receives the missing parameters through the cloud interface, the parameters can be used by the self-service application 220 and/or the HMS 222 to provision the remaining software modules. By allowing the client device 222 to provide parameters gradually over time as they become known, the service cloud can immediately provision all or some of the modules that are ready, and immediately provide a means by which the client device 202 can provide any remaining parameters and complete the provisioning of the remaining modules. Because the service cloud is able to provide a way for the client device 202 to access and use any licensed software modules that were part of the purchased software package, the service cloud can immediately recognize revenue from the purchase instead of needing to wait until all of the information has been provided from the client device 202. The self-service application 220 provides a way for clients to begin using individual software modules in their software package as they are ready without requiring hands-on involvement from human customer service representatives associated with the service cloud. The following diagrams and figures will illustrate how a request for a software package can be incrementally provisioned using the HMS 222 and the self-service application 220.

In one embodiment, the various modules and systems in FIG. 2 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

Figure 3:
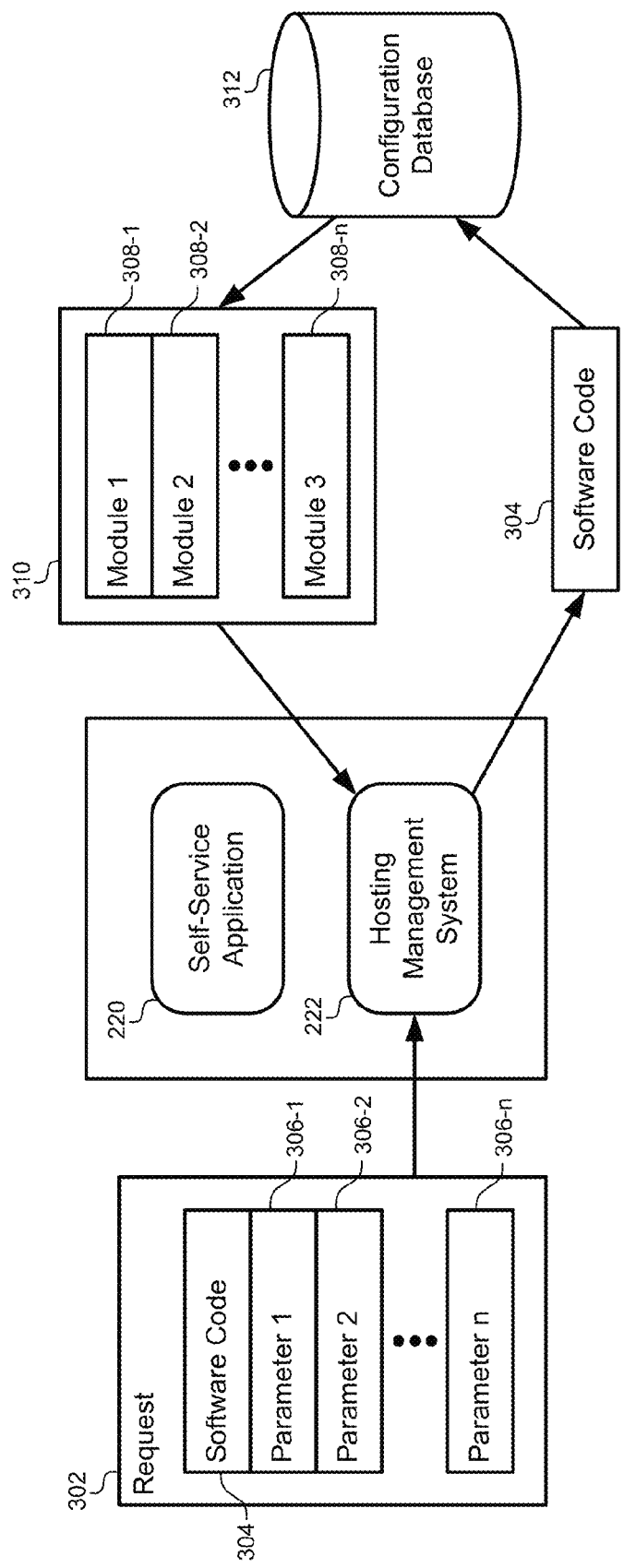
FIG. 3 illustrates a simplified block diagram of a system for receiving and processing a provisioning request, according to one embodiment.

FIG. 3 illustrates a simplified block diagram of a system for receiving and processing a provisioning request, according to one embodiment. As described above, the request 302 for the software package may be received from a client device by one or more components of the service cloud. The request 302 may include a code 304, which may also be referred to as an identifier, product number, and so forth. The code 304 may be a unique number assigned to the software package. As will be described in greater detail below, this code 304 can be decoded to determine which software modules are part of the software package for the request 302. The request 302 may also include one or more parameters 306. The parameters 306 may include point of contact information, an email address, a purchasing account, a customer ID number, as well as technical information for each of the software modules in the requested software package, including numbers of instances, URLs, memory requirements, data center locations, and so forth.

The request 302 may be routed by the service cloud to an HMS 222 that can handle the request 302. After receiving the request 302, the HMS 222 can use the software code 304 to determine one or more software modules 308 that are part of the requested software package. In one embodiment, the software code 304 can be used to index an entry in a configuration database 312 and return a list of modules 308 that are part of the software package. In some embodiments, a configuration file 310 may include a listing of the various software modules 308. In other embodiments, the code 304 can actually store the module information therein rather than being used to index a configuration database 312, a lookup table, or other data structure. For example, the code 304 may include a series of digits, each of which refers to a particular software module 308.

Figure 4:
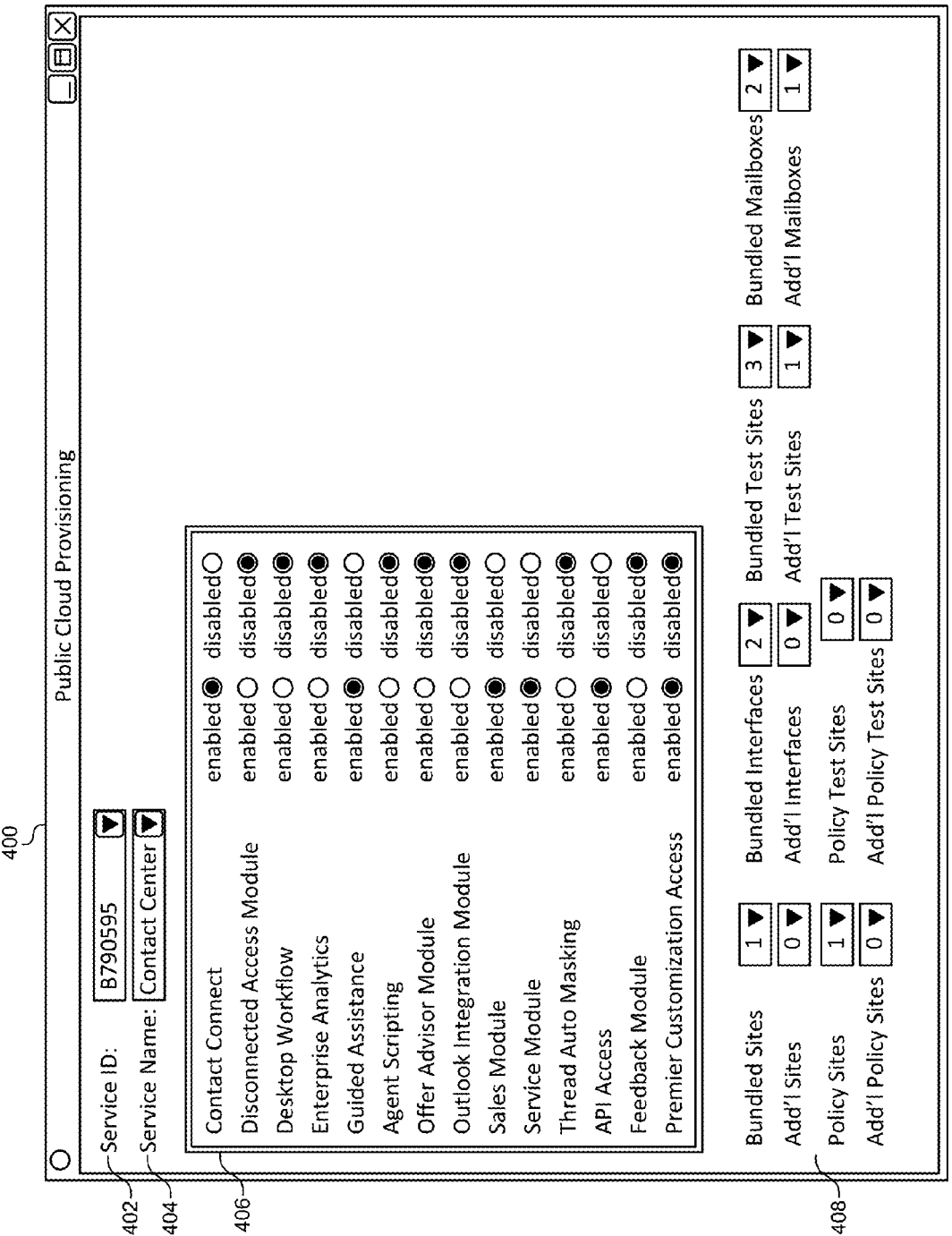
FIG. 4 illustrates an interface for generating a configuration file defining a software package, according to one embodiment.

FIG. 4 illustrates an interface for generating a configuration file defining a software package, according to one embodiment. Interface 400 illustrates how a configuration file can be generated to define a particular software package. A software package may include an ID 402 and/or a name 404. In some embodiments, the ID 402 may be used as the code 304 from FIG. 3 to uniquely identify each software package. A listing of available software modules 406 may be provided as part of interface 400. The service cloud administrator can select various software modules for a given software package. As illustrated by FIG. 4, software modules within the service cloud may include contact management, a desktop workflow, enterprise analytics, guided assistance, agent scripting, offer advisor modules, Outlook integration modules, sales modules, service modules, thread auto masking modules, feedback modules, and so forth. An administrator of the service cloud can group the available software modules 406 together in combinations that meet current customer demands, and can also provide promotional packages with defined start and end dates. Additionally, interface 400 can allow an administrator to specify a number of various instances of services that will be provided as part of the software package. For example, the administrator can select a number of sites, interfaces, test sites, mailboxes, policy sites, policy test sites, and so forth.

By using interface 400, service cloud administrators can dynamically change the contents of each software package.

If a software package changes over time, the name 404 can stay the same in order to generate brand recognition with customers. However, the ID 402 can change. By allowing customers to incrementally provisioned software modules over time, the ID 402 can provide a snapshot of what was included in the software package when it was originally purchased. Before the software package is completely provisioned, the contents of the package may have changed, but because the ID 402 for the related configuration file remains constant, two different versions of the software package me be provisioned by two different customers during overlapping time intervals.

Figure 5:
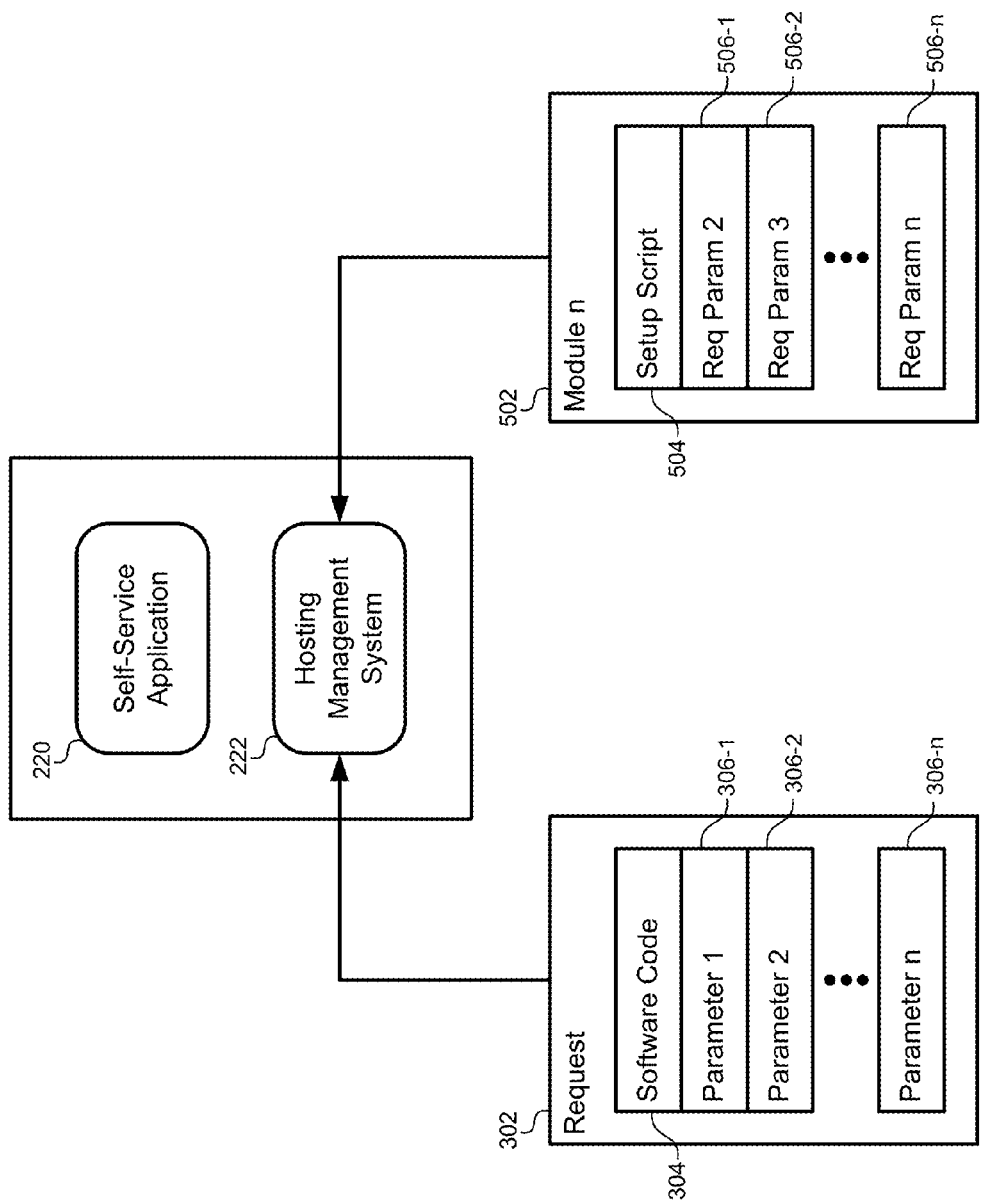
FIG. 5 illustrates a simplified block diagram of a system using scripts to provision modules in a software package, according to one embodiment.

FIG. 5 illustrates a simplified block diagram of a system using scripts to provision modules in a software package, according to one embodiment. After determining the software modules that are included in the requested software package, the cloud service can begin attempting to provision each of the software modules. In order to determine if a particular software module 502 can be provisioned at the current time, the cloud service can compare the one or more parameters 306 included with the request 302 to the required parameters 506 that are required to provision the module 502. If each of the required parameters 506 has a corresponding match in the one or more parameters 306 provided with the request, then the module 502 can be installed. Each module configuration file can include a link to a setup script 504 that includes all the technical details for instantiating and provisioning the particular module 502. The actual code included in the setup script 504 will be the uniquely determined by the requirements of the particular software module 502, and are thus beyond the scope of this disclosure. Because the service cloud may include many different types of services and products, the set of scripts for each module will tend to vary greatly. For example, one set of scripts could create a web logic domain to set up a database, set up PHP scripting for a web application, allocate memory for the website, secure rights to a domain name, instantiate various instances of software applications on various data centers worldwide throughout the service cloud, and so forth. Because the HMS 222 will understand the details, the setup script 504 for each module may be coded as part of the HMS 222. Alternatively, the setup script 504 may be stored separately and referenced by the configuration file retrieved using the code 304. This process of provisioning each module that has the required parameters provided by the request can be carried out according to each unique setup script associated with each module.

In one embodiment, the HMS 222 performs the setup of interfaces, mailboxes and test instances. An interface represents an instance of an application available in a specific language, such as Japanese. Configuring an interface requires as inputs parameters specifying the chosen language and a URL that the user would like to use to provide access the application for this specific language. A mailbox may be used to send and receive emails from customers as well as process the received emails. Setting up a mailbox requires details specifying an SMTP server, an e-mail address, and a name from the inbox. Similarly, a test instance represents a true/partial copy of a production instance. A test instance requires a name at a minimum and the option to copy the full instance or selective part of the instance. As an example, to setup a mailbox, the HMS 222 may invoke an API on an IMAP/SMTP server to create an account with a username (e.g. an inbox name) and a password. It then provides username and password to the application to send/consume emails from this account. Similarly to create an test copy, HMS 222 may first copy the database (either in full or selective parts, such as the most recent data). The HMS 222 then copies the application files. Finally, the HMS 222 sets up network routers and load balancers and provisionas a new URL for the test instance.

Figure 6:
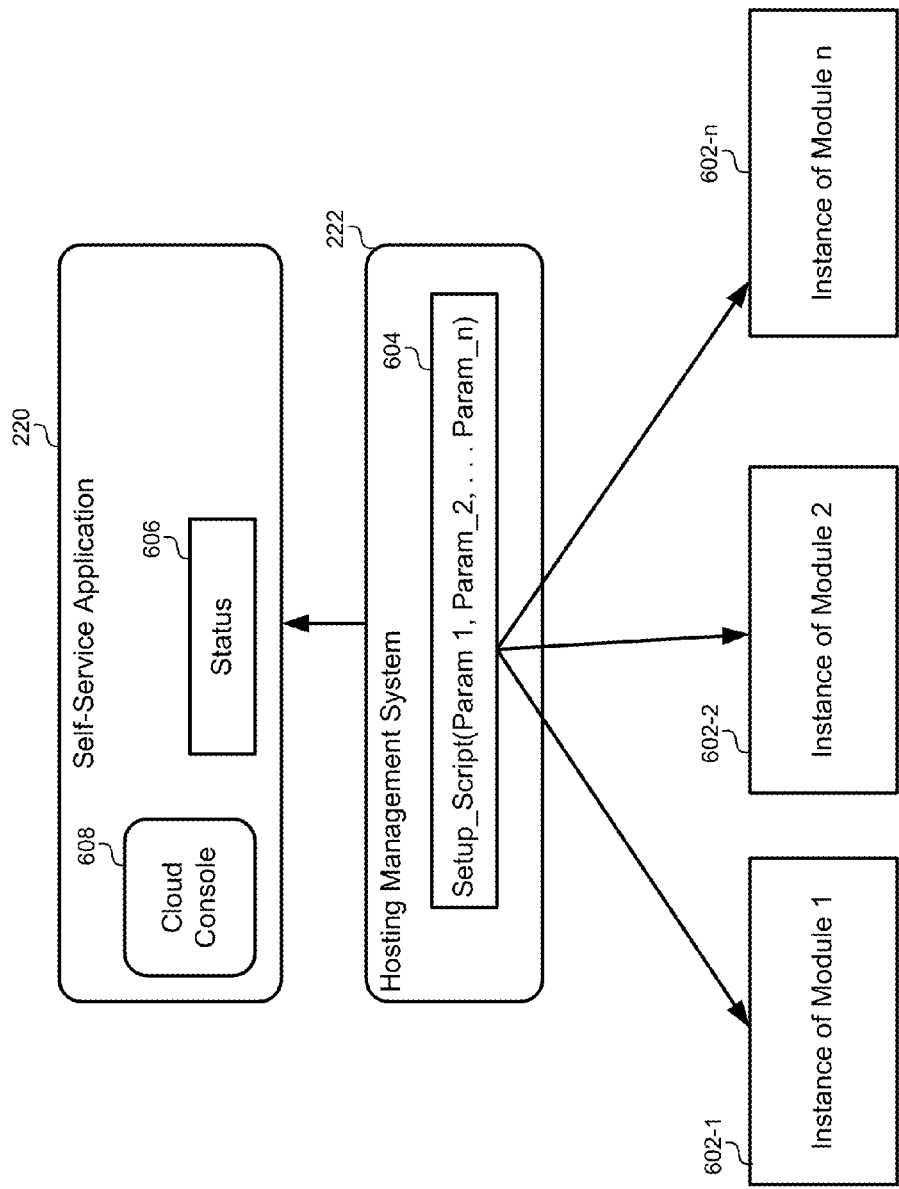
FIG. 6 illustrates a block diagram of a system for provisioning modules with provided parameters, according to one embodiment.

FIG. 6 illustrates a block diagram of a system for provisioning modules with provided parameters, according to one embodiment. Generally, all of the parameters required to instantiate each software module in the software package will not be provided at the time of the initial request for the software package. Some parameters may be missing, and in some cases it may take weeks or months in order to finally resolve these parameters. For example, a customer may wish to provide a version of their website in Japanese sometime during the next quarter. However, the customer may not know exactly when the website will be ready or what domain name in Japan will be used. However, they do want to provision the Japanese website as part of their software package purchase in order to take advantage of bundled pricing for convenience. After provisioning the software modules that have required parameters, the service cloud can provide a self-service application 220 that is configured to receive parameters gradually over time and initiate the provisioning of software modules when the required parameters for each have been acquired.

The HMS 222 can send the status 606 to the self-service application 220 that stores the state of the software package provisioning process. It may include indications of which modules have already been installed, which parameters have been received, which parameters are still required, as well as protocols that determine when the self-service application 220 should reach out to the client device electronically to solicit the missing parameters. The self-service application 220 may provide a cloud console 608 to interface with the client device 202 and gather the missing required parameters.

At this point, the HMS 222 can execute the setup script for each module using the parameters provided as part of the original request. When the script 604 is executed, one or more instances 602 of each module may be generated and distributed throughout data centers in the service cloud. Generally, the instances 602 of the modules can be fully provisioned within a few hours of the original request. After they have been provisioned, the service cloud can send an indication to the client device 202 that the provisioning process is underway. The indication may come in the form of an email or URL that provides license and access information to each of the software modules in the requested software package. The indication may provide a listing of the instances 602 of modules that have already been instantiated and provisioned. The indication may also provide a listing of software modules that can be self-provisioned using the self-service application 220 along with the required parameters needed by the self-service application 220 to complete the provisioning for each remaining software module. In some embodiments, once this indication is sent to the client device 202, the service cloud can be said to have sufficiently provisioned the software package such that revenue can be recognized internally. Because the customer has been provided with either (i) access to fully provision software modules, or (ii) a means by which the customer can self-provision any remaining software modules, the responsibility has transition from the service cloud back to the customer.

Figure 7:
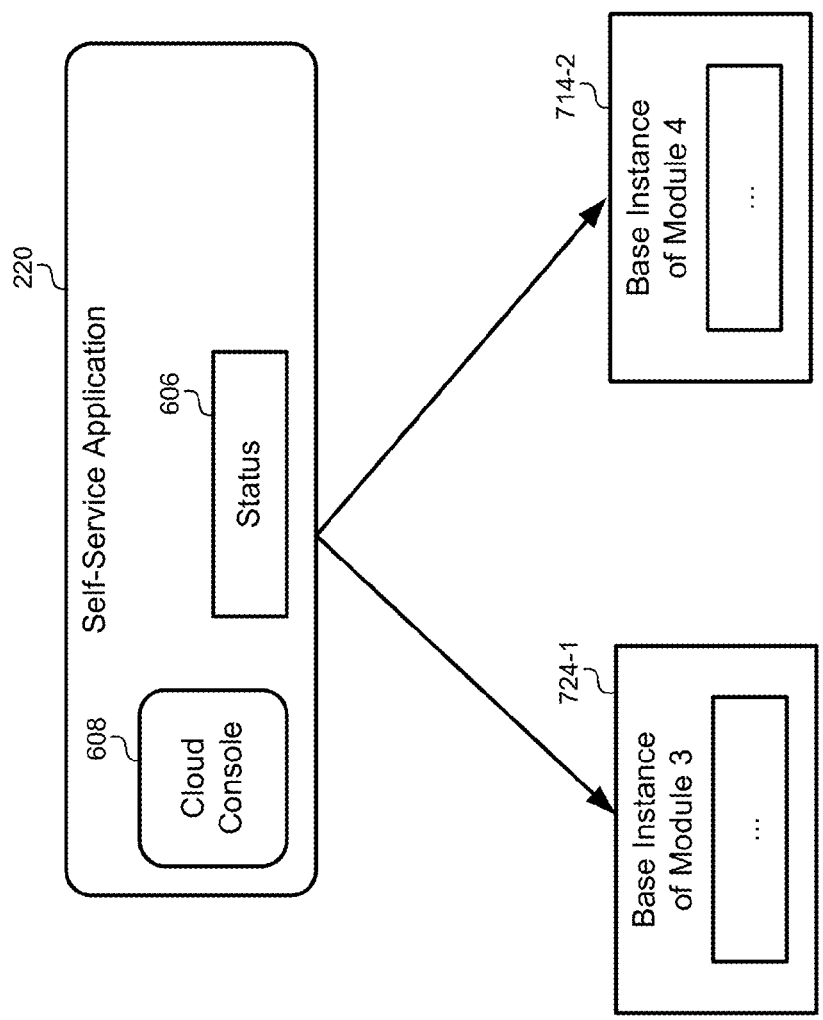
FIG. 7 illustrates a block diagram of a system for provisioning a base instance of modules without provided parameters, according to one embodiment.

FIG. 7 illustrates a block diagram of a system for provisioning a base instance of modules without provided parameters, according to one embodiment. In some embodiments, the self-service application 220 can provision a base instance 714 of any software modules that are still waiting for required parameters. The base instance of each module may be comprised of a software shell or a less-than-fully-functional version of the module. The base instances 714 may use placeholders or dummy data in the place of the actual customer parameters. In some cases, a base instance be comprised of a single instance of a site, where the fully provisioned module will be comprised of multiple site instances. In some embodiments, instantiating the base instances 714 can reduce the amount of processing that needs to take place when the parameters are eventually received by the self-service application 220. With most of the provisioning process completed, the self-service application 220 can simply use the parameters received from the customer to configure the base instances 724, rather than needing to provision them from scratch when the parameters are received.

The HMS allows users to create an instance from an empty base instance. The base instance may be created and made ready with a minimal amount of data. In some cases, there may be several such base instances that suit the most common settings provided by customers. For example, instances can be categorized by domain (healthcare, finance, retail, etc.), by size (small, medium, enterprise, extra large instance), and so forth. The base instances may be provisioned in an inactive state, such that they are stored copies/images of the product. The HMS can then create a copy of the instance, update parameters as needed and activate the copy which then becomes the running instance of the customer in the future when the missing parameters are provided. The base instances may be labeled as "templates" in the HMS. The base instance may include a database with seed data and a file directory with base set of files (e.g., out-of-the-box code). The database may be stored in one of the available database servers. The base files may be part of an archive (e.g., a zip, tar, .or gz archive).

Figure 8:
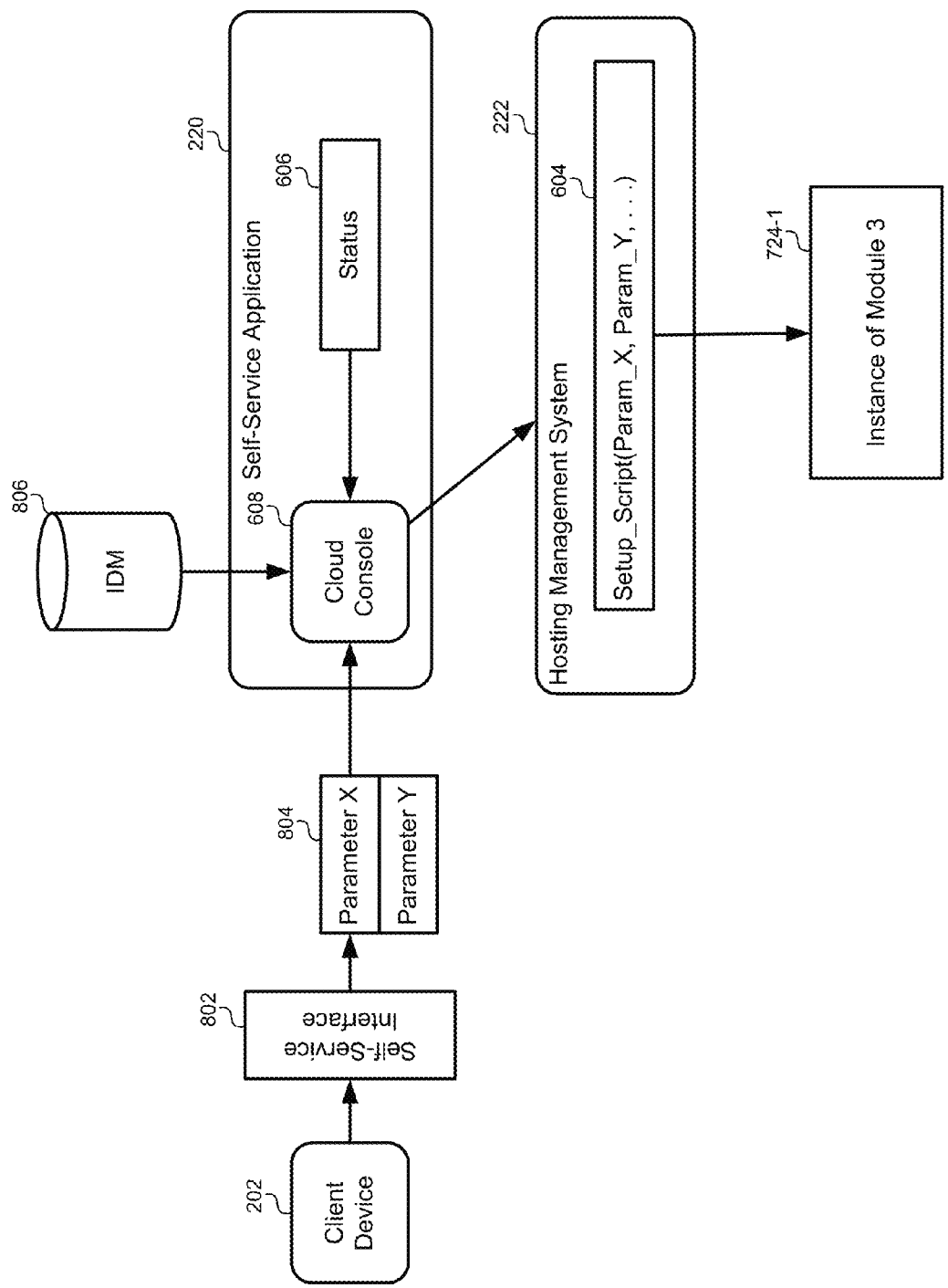
FIG. 8 illustrates a block diagram of a self-service application receiving parameters and provisioning base instances, according to one embodiment.

FIG. 8 illustrates a block diagram of a self-service application receiving parameters and provisioning base instances, according to one embodiment. At some point in the future, the client device 202 can access the cloud console 608 in the self-service application 220 in order to provide one or more of the missing parameters 804 required to provision some of the on unprovisioned software modules in the requested software package. The cloud console 608 may provide a self-service interface 802 in the form of a webpage, a web form, a web service, or any other form of data portal that allows the client device 202 to provide parameters 804 to the self-service application 220. In some embodiments, the client device 202 can login to the cloud console 608 and have a user account identified and authenticated by an identity management system 806 for the service cloud. The authenticated identity can be used to locate a corresponding status 606 of the provisioning process for the particular client device 602 and/or associated user account. The cloud console 608 can provide an indication to the client device 202 regarding the progress of the provisioning of the software modules. The indication may include a request for the missing parameters 804.

Once the client device 202 provides the missing parameters 804, the self-service application 220 can compare the missing parameters 804 to the parameters required by the setup scripts of any software modules that are not already completely provisioned. Note that the client device 202 can provide missing parameters 804 incrementally. In other words, the client device 202 can login to the cloud console 608 repeatedly over time and provide one or more of the missing parameters 804 as they become known. With each new parameter received, the service cloud can compare the received parameters to the required parameters for any remaining software modules, and then provision any software modules where there parameter requirements have been satisfied.

In some embodiments, the missing parameters 804 may be passed back to the HMS 222 and a setup script 604 for each remaining software module can be executed. In the example of FIG. 8, software module 724-1 was previously provisioned as a base instance in FIG. 7. The setup script 604 executed in FIG. 8 can replace any placeholder parameters used in the base instance and/or provision any additional instances of module 724-1.

Figure 9:
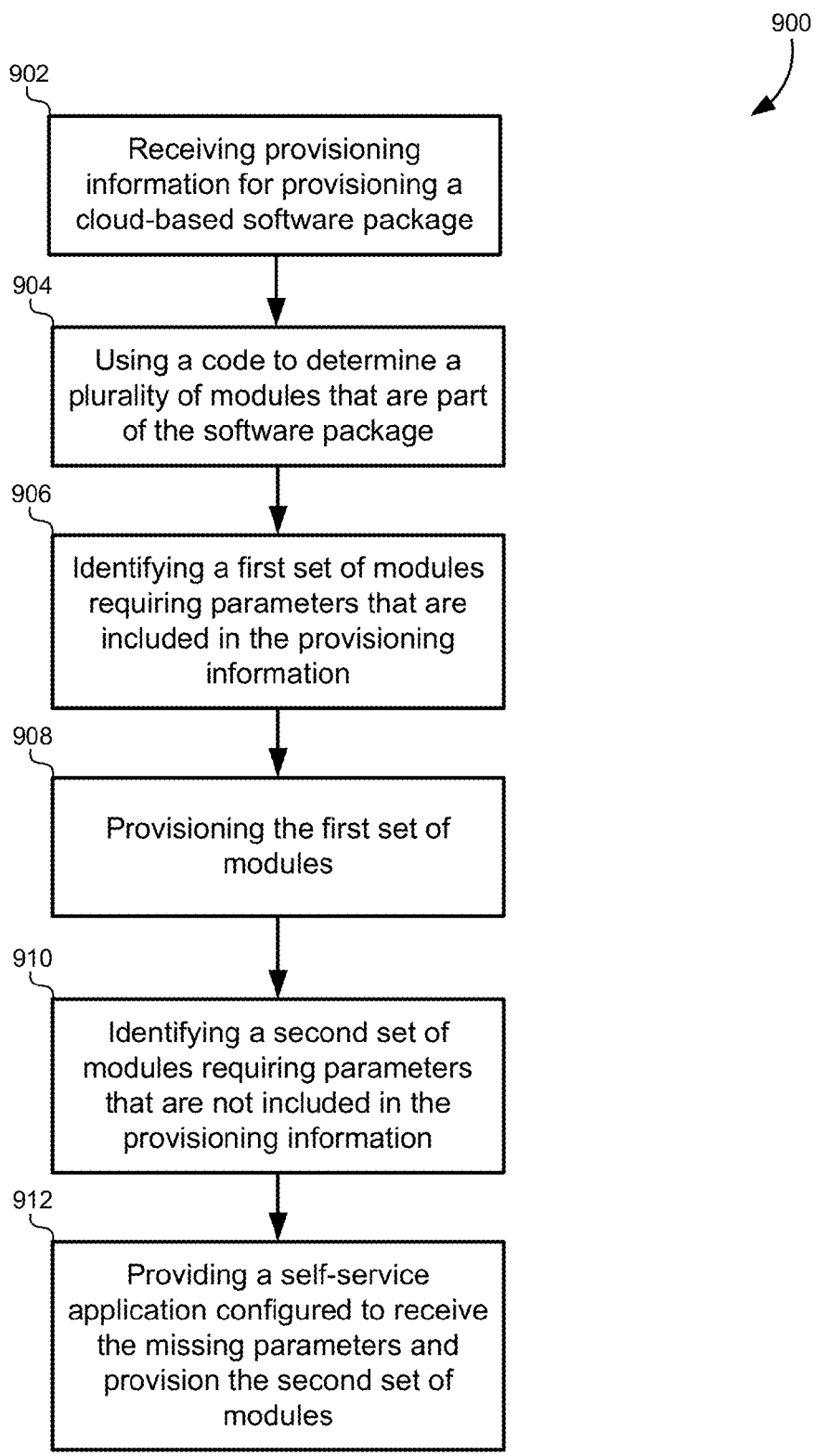
FIG. 9 illustrates a flowchart of a method for provisioning cloud-based services, according to one embodiment.

FIG. 9 illustrates a flowchart of a method for provisioning cloud-based services, according to one embodiment. The method may include receiving provisioning information for provisioning a cloud-based software package (902). The provisioning information may be received from a client device through a web interface used to purchase cloud services. The software package may include one or more software modules, such as a chat module, a policy automation module, a customer service module, and enterprise analytics module, and/or the like. In some embodiments, the provisioning information may include code that identifies the software package and that can be decoded to determine which software modules are part of the software package. The provisioning information may also include one or more parameters for provisioning the software package. For example, the provisioning information may include at least a baseline set of information that should be known to any purchasing entity, such as contact information, an email address, an account number, a customer name, and so forth.

The method may also include using the code provided in the provisioning information to determine a plurality of modules that are part of the software package (904). Each individual software module may be associated with one or more required parameters that are needed to fully install and provision the software module. The code may be decoded by indexing a configuration file or locating an entry in a lookup table or database that specifies software modules for the particular software package. The code may also be decoded by extracting character or digit strings from the code that identify software modules.

The method may additionally include identifying a first set of software modules (906). The first set of software modules may be a subset of the plurality of modules included in the software package. The first set of modules may be identified as requiring parameters for provisioning that are included in the one or more parameters from the provisioning information for the request of the software package. In some embodiments, the service cloud can compare the parameters provided with the request to parameters required for each software module, and then identify software modules that have a complete set of parameters. The method may then further include provisioning the first set of modules using at least some of the parameters provided by the provisioning information of the request (908). In some embodiments, each module may be associated with a respective software script that includes specific instructions for instantiating instances of the software module and setting up hardware resources in particular data centers of the service cloud. The service cloud may execute the software scripts using the provided parameters.

The method may also include identifying a second set of modules (910). The second set of modules may also be a subset of the plurality of modules, and the second set of modules may require parameters that are not included in the one or more parameters provided by the provisioning information of the software request. In some embodiments, the service cloud may instantiate a base instance of each of the second set of modules. The base instance may include placeholder data or be otherwise incomplete without required parameters. The method may further include providing a self-service application configured to receive the missing parameters and provision the second set of modules (912). The missing parameters may be provided over time through an interface provided by the self-service application. In some embodiments, the service cloud may send an indication to the requesting client device regarding the progress of the provisioning process. The indication may include licensing information and a link to access the provisioned services, as well as a link to the self-service application in order to provide any missing parameters. When the missing parameters are provided through the self-service application, the service cloud can then provision the remaining software modules.

It should be appreciated that the specific steps illustrated in FIG. 9 provide particular methods of provisioning cloud-based services according to various embodiments of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system, such as computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 10:
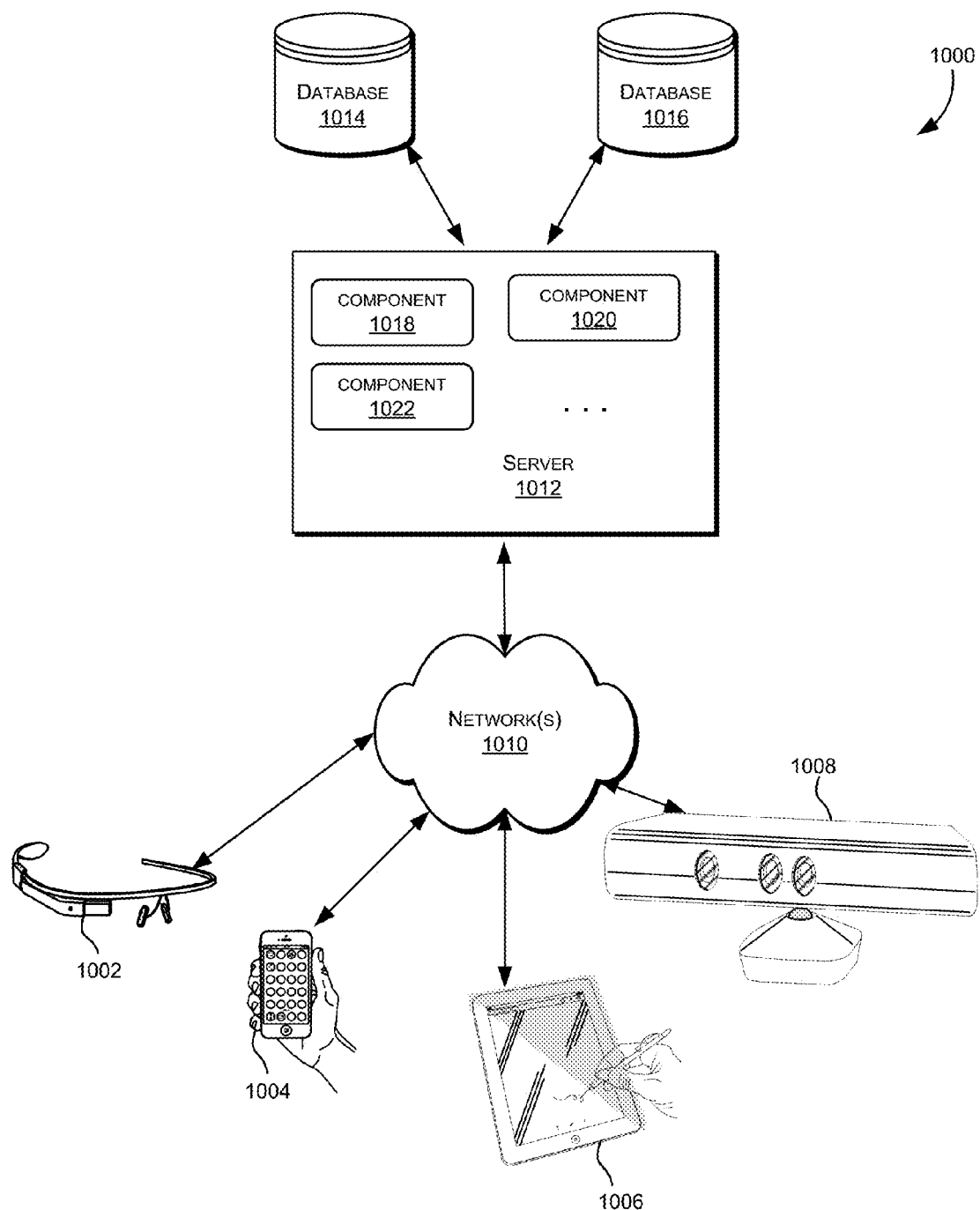
FIG. 10 illustrates a simplified block diagram of a distributed system for implementing some of the embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
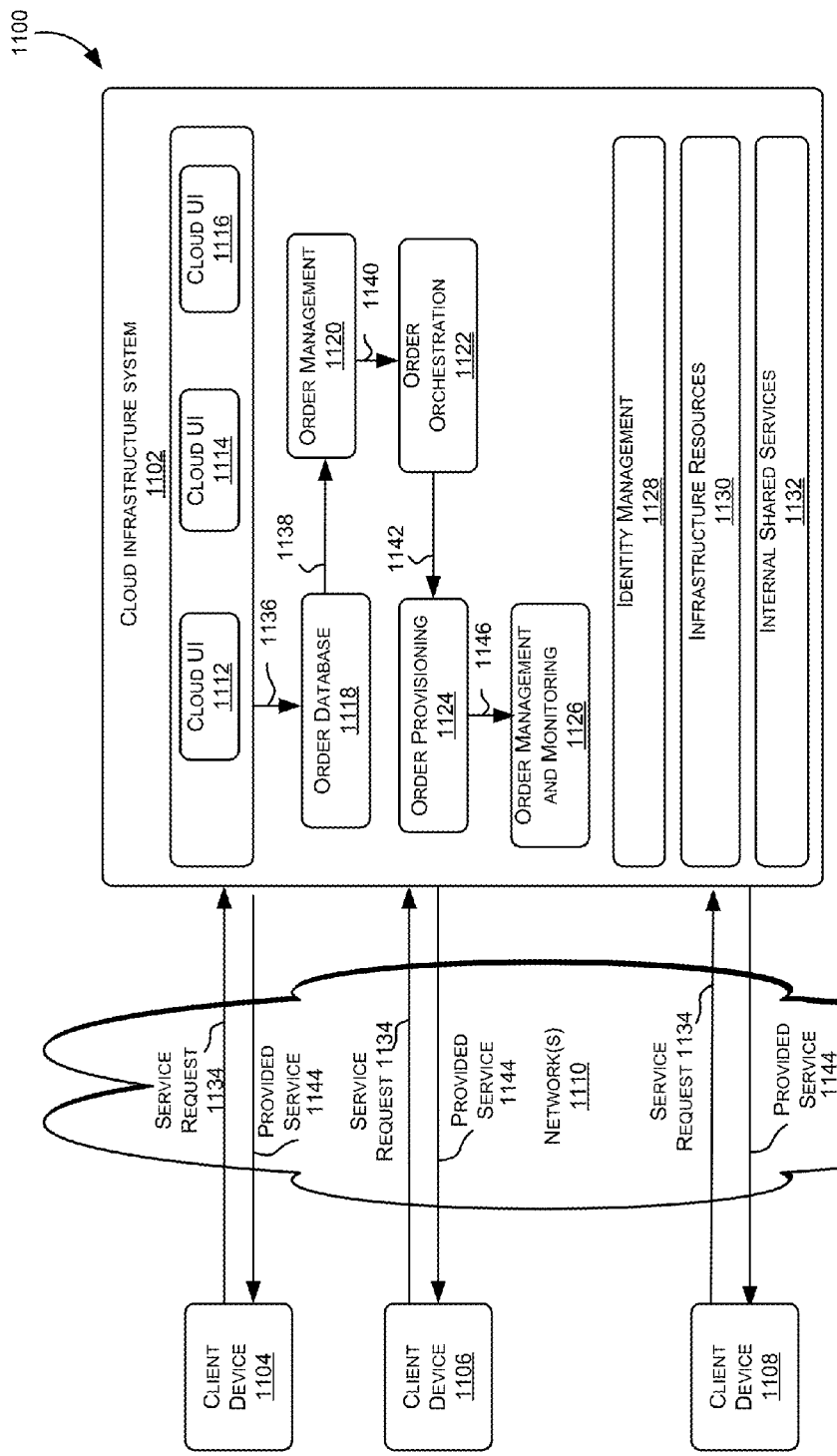
FIG. 11 illustrates a simplified block diagram of components of a system environment by which services provided by the components of an embodiment system may be offered as cloud services.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1010.

Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
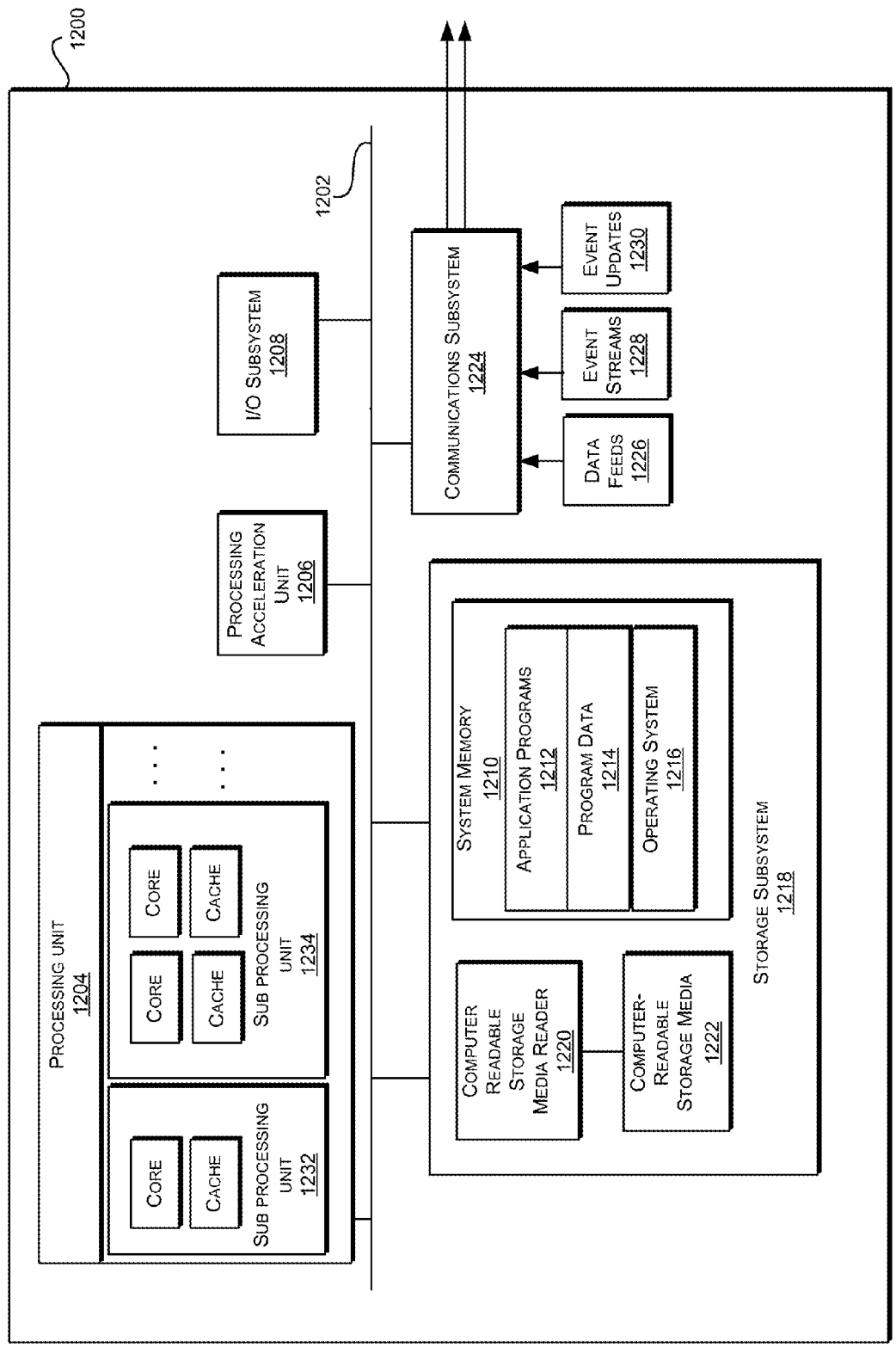
FIG. 12 illustrates an exemplary computer system, in which various embodiments may be implemented.

FIG. 12 illustrates an exemplary computer system 1200, in which various embodiments of the present invention may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of provisioning cloud-based software, the method comprising:
   receiving, at a public cloud interface and from a client device, provisioning information for provisioning a cloud-based software package, the provisioning information comprising:
      a code that identifies the software package; and
      one or more parameters for provisioning the software package;
   automatically decoding, by a cloud computer system, the code to determine a plurality of modules that are part of the software package;

performing a comparison of the one or more parameters for provisioning the software package with parameters required for each of the plurality of modules that are part of the software package;
automatically selecting based on the comparison, by the cloud computer system, a first set of modules, wherein the first set of modules is a subset of the plurality of modules that is selected by determining modules in the plurality of modules for which all parameters required for provisioning are known after receiving the one or more parameters from the client device;
automatically selecting based on the comparison, by the cloud computer system, a second set of modules, wherein the second set of modules is a subset of the plurality of modules that is selected by determining modules in the plurality of modules that require parameters that are not known after receiving the one or more parameters from the client device;
provisioning, by the cloud computer system, the first set of modules using at least some of the one or more parameters;
provisioning, by the cloud computer system, a base instance of each of the second set of modules, wherein the base instances include placeholder data corresponding to the required parameters that are not known; and
providing, by the cloud computer system, a self-service application configured to:
receive, at a later time from the client device, the required parameters that are not known; and
replacing the placeholder data with the received required parameters.

2. The method of claim 1, further comprising sending a link associated with the self-service application to the client device.

3. The method of claim 1, further comprising:
identifying a first set of scripts, wherein each of the first set of scripts is associated with a respective one of the first set of modules, wherein each of the first set of scripts is executable to provision the first set of modules.

4. The method of claim 1, wherein the one or more parameters comprises a number of site instances to be provisioned.

5. The method of claim 1, further comprising storing a status for provisioning a cloud-based software package after identifying the second set of modules, wherein the status comprises the provisioning information and an indication of the required parameters that are not known.

6. The method of claim 1, further comprising automatically selecting between a plurality of available cloud data centers on which to provision the first set of modules using a load balancer.

7. A non-transitory, computer-readable medium comprising instructions which, when executed by one or more processors, causes the one or more processors to perform operations comprising:
receiving, from a client device, provisioning information for provisioning a cloud-based software package, the provisioning information comprising:
a code that identifies the software package; and
one or more parameters for provisioning the software package;
automatically decoding, by a cloud computer system, the code to determine a plurality of modules that are part of the software package;
performing a comparison of the one or more parameters for provisioning the software package with parameters required for each of the plurality of modules that are part of the software package;
automatically selecting, based on the comparison, a first set of modules, wherein the first set of modules is a subset of the plurality of modules that is selected by determining modules in the plurality of modules for which all parameters required for provisioning are known after receiving the one or more parameters from the client device;
automatically selecting, based on the comparison, a second set of modules, wherein the second set of modules is a subset of the plurality of modules that is selected by determining modules in the plurality of modules that require parameters that are not known after receiving the one or more parameters from the client device;
provisioning the first set of modules using at least some of the one or more parameters;
provisioning, by the cloud computer system, a base instance of each of the second set of modules, wherein the base instances include placeholder data corresponding to the required parameters that are not known; and
providing a self-service application configured to:
receive, at a later time from the client device, the required parameters that are not known; and
replacing the placeholder data with the received required parameters.

8. The non-transitory computer-readable medium according to claim 7 wherein the instructions cause the one or more processors to perform additional operations comprising sending a link associated with the self-service application to the client device.

9. The non-transitory computer-readable medium according to claim 7 wherein the instructions cause the one or more processors to perform additional operations comprising:
identifying a first set of scripts, wherein each of the first set of scripts is associated with a respective one of the first set of modules, wherein each of the first set of scripts is executable to provision the first set of modules.

10. The non-transitory computer-readable medium according to claim 7 wherein the instructions cause the one or more processors to perform additional operations comprising:
further comprising storing a status for provisioning a cloud-based software package after identifying the second set of modules, wherein the status comprises the provisioning information and an indication of the required parameters that are not known.

11. The non-transitory computer-readable medium according to claim 7 wherein the instructions cause the one or more processors to perform additional operations comprising:
further comprising automatically selecting between a plurality of available cloud data centers on which to provision the first set of modules using a load balancer.

12. A system comprising:
one or more processors; and
one or more memory devices comprising instructions which, when executed by the one or more processors, cause the one or more processors to perform operations comprising:
receiving, from a client device, provisioning information for provisioning a cloud-based software package, the provisioning information comprising:
a code that identifies the software package; and
one or more parameters for provisioning the software package;

automatically decoding, by a cloud computer system, the code to determine a plurality of modules that are part of the software package;

performing a comparison of the one or more parameters for provisioning the software package with parameters required for each of the plurality of modules that are part of the software package;

automatically selecting, based on the comparison, a first set of modules, wherein the first set of modules is a subset of the plurality of modules that is selected by determining modules in the plurality of modules for which all parameters required for provisioning are known after receiving the one or more parameters from the client device;

automatically selecting, based on the comparison, a second set of modules; wherein the second set of modules is a subset of the plurality of modules that is selected by determining modules in the plurality of nodules that require parameters that are not known after receiving the one or more parameters from the client device;

provisioning the first set of modules using at least some of the one or more parameters;

provisioning, by the cloud computer system, a base instance of each of the second set of modules, wherein the base instances include placeholder data corresponding to the required parameters that are not known; and providing a self-service application configured to:
receive, at a later time from the client device, the required parameters that are not known; and
replacing the placeholder data with the received required parameters.

13. The system of claim 12 wherein the instructions further cause the one or more processors to perform additional operations comprising sending a link associated with the self-service application to the client device.

14. The system of claim 12 wherein the instructions further cause the one or more processors to perform additional operations comprising:
identifying a first set of scripts, wherein each of the first set of scripts is associated with a respective one of the first set of modules, wherein each of the first set of scripts is executable to provision the first set of modules.

15. The system of claim 12 wherein the instructions further cause the one or more processors to perform additional operations comprising:
storing a status for provisioning a cloud-based software package after identifying the second set of modules, wherein the status comprises the provisioning information and an indication of the required parameters that are not known; and
automatically selecting between a plurality of available cloud data centers on which to provision the first set of modules using a load balancer.

* * * * *

UNITED STATES PATENT AND TRADEMARK OFFICE
CERTIFICATE OF CORRECTION

PATENT NO. : 9,886,254 B2
APPLICATION NO. : 14/590680
DATED : February 6, 2018
INVENTOR(S) : Venkata Naga Ravi Kiran Vedula, Justin Cheevers and Monty Bucholz It is certified that error appears in the above-identified patent and that said Letters Patent is hereby corrected as shown below:

On the Title Page

Item (72) Inventors: Delete "Venkata Naga Ravikiran Vedula, Belmont, CA (US)" and insert
-- Venkata Naga Ravi Kiran Vedula, Belmont, CA (US) --

Signed and Sealed this
Fourth Day of September, 2018

Andrei Iancu
*Director of the United States Patent and Trademark Office*